United States Patent [19]
Bentley

[11] 3,715,291
[45] Feb. 6, 1973

[54] METHOD OF RECOVERING SILVER FROM WASTE SILVER SOLUTIONS

[75] Inventor: James Sydney Bentley, London, England

[73] Assignee: Photographic Silver Recovery Limited, London, England

[22] Filed: Sept. 9, 1970

[21] Appl. No.: 70,644

[30] Foreign Application Priority Data

Sept. 11, 1969  Great Britain.....................44,978/69
April 16, 1970  Great Britain.....................18,288/70

[52] U.S. Cl. ................204/109, 204/212, 204/218, 204/229, 204/275
[51] Int. Cl. ............................C22d 1/12, B01r 3/00
[58] Field of Search......204/212, 218, 273, 275–276, 204/229, 223, 237–239, 109

[56] References Cited

UNITED STATES PATENTS

| | | | |
|---|---|---|---|
| 1,937,179 | 11/1933 | Weisberg et al.................204/273 X |
| 1,905,467 | 4/1933 | Hickman..........................204/109 |
| 3,551,317 | 12/1970 | Cooley..............................204/212 |
| 3,458,425 | 7/1969 | Tolle et al. ........................204/280 |
| 1,885,702 | 11/1932 | Fink .................................204/229 |
| 1,319,734 | 10/1919 | Thorold et al........................204/229 |

FOREIGN PATENTS OR APPLICATIONS

| | | | |
|---|---|---|---|
| 879,284 | 11/1942 | France .............................204/109 |
| 1,133,565 | 7/1962 | Germany..........................204/109 |

*Primary Examiner*—John H. Mack
*Assistant Examiner*—Regan J. Fay
*Attorney*—Rose & Edell

[57] ABSTRACT

The recover of silver from waste silver solutions, especially spent photographic processing liquids, is effected with a silver recovery machine, such as a rotating cathode machine, and an auxiliary tank installed immediately upstream of the silver recovery machine to receive the silver waste solution from film processing equipment or other source. A metering pump delivers the waste solution from the auxiliary tank to the silver recovery machine, the pump being started and stopped in dependence upon changes in the level of the waste solution in the auxiliary tank. The silver recovery machine is arranged to operate only while the metering pump is running, this operation being at a constant current setting.

9 Claims, 3 Drawing Figures

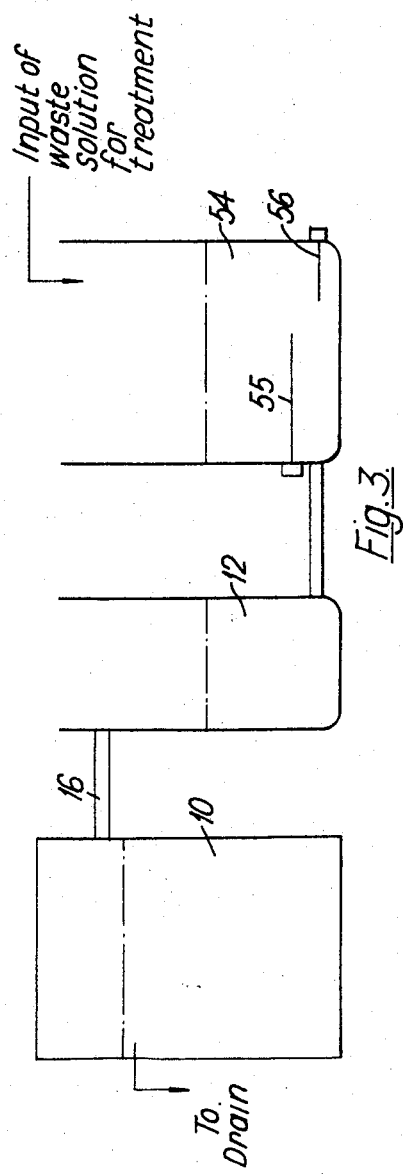

METHOD OF RECOVERING SILVER FROM WASTE SILVER SOLUTIONS

This invention relates to the recovery of silver from the waste silver solutions that are produced in photographic and like processing.

Silver recovery as now practised, especially by hospital X-ray units, includes the use of metal exchange baths containing steel wool. This method is grossly inefficient. More efficient electrolytic plating machines are already available for recovering silver on a rotating cathode assembly. However, a problem that exists in the operation of such machines resides in the fact that the plating current needs to be varied in relation to the concentration of silver in solution. Although the total daily output of waste solutions from a film processing house or hospital X-ray department is often reasonably constant, the fluctuations in output during any one day may be considerable. This means that, with the silver recovery machine coupled directly to the waste outlet of the film processor, the silver density of the solution in the recovery machine will be subject to frequent changes. If the current flow in the recovery machine is set at a high amperage sufficient to deal with the large silver concentrations that build up when the flow of silver is high, this can lead to sulphiding and fouling of the tank when the silver concentration is low. Therefore, to avoid sulphiding at low rates of silver waste flow the tendency is to fix the current amperage at a much lower level; but this results in loss of silver due to the discharge from the recovery machine of inadequately processed silver waste when the film processor output is high.

To deal with this difficulty, electronic devices have been developed to sense the silver concentration in the solution in the recovery machine on a continuous basis and monitor the current amperage setting accordingly. Unfortunately, such equipment is costly and also it introduces a fresh range of considerations in regard to installation, servicing and spares stocking, all of which become more expensive. It is thus an object of this invention to provide a solution which is simpler and less expensive.

According to the present invention, an auxiliary tank is installed, immediately upstream of the silver recovery machine, to receive the silver waste solution from the film processing equipment or other source, a metering pump delivers the waste solution from this auxiliary tank to the silver recovery machine, this pump being started and stopped in dependence on changes in the level of the waste solution in the auxiliary tank, and the silver recovery machine is arranged to operate only while the metering pump is running, this operation being at a constant current setting.

Although the outflow rate of waste silver solution from a film processor varies greatly, the silver concentration in the solution remains substantially constant. Therefore, the solution in the auxiliary tank has a substantially fixed silver concentration. The metering pump, when pumping, delivers this solution at a constant flow rate into the recovery unit and thus the flow conditions obtaining in the recovery unit, during the periods when it is actually operation, are always the same in that a constant flow of solution enters with a constant silver concentration. This enables a fixed current amperage to be selected appropriate to this particular silver concentration and the problems associated with varying silver concentrations and a more or less arbitrarily selected current value disappear.

Only simple level switches are needed to effect the starting and stopping of the metering pump, correspondingly intermittent operation of the recovery unit being controlled by the same switch circuitry. The additional equipment necessary for implementing the invention is thus essentially simple and inexpensive in character and does not give rise to any special difficulties in installation or maintenance. Although the recovery unit may be running only intermittently it nevertheless can operate while running at maximum efficiency despite the fluctuations in outflow from the film processor. It may, in some cases, be possible to install only one recovery machine in situations where there would formerly have needed to be two to cope with occasional or short term high outflows from the processor. Other benefits also accrue from the employment of the invention as will hereinafter be apparent.

We have also found that the plating rates possible in the silver recovery unit without sulphiding are affected by the temperature of the plating bath. An electrical heating element and a temperature sensing control may therefore be employed to keep the temperature of the waste solution being treated substantially at an optimum value.

Arrangements embodying the invention are shown by way of example in the accompanying diagrammatic drawings, in which:

FIG. 3 is a diagram illustrating a modified arrangement.

Figure 1:
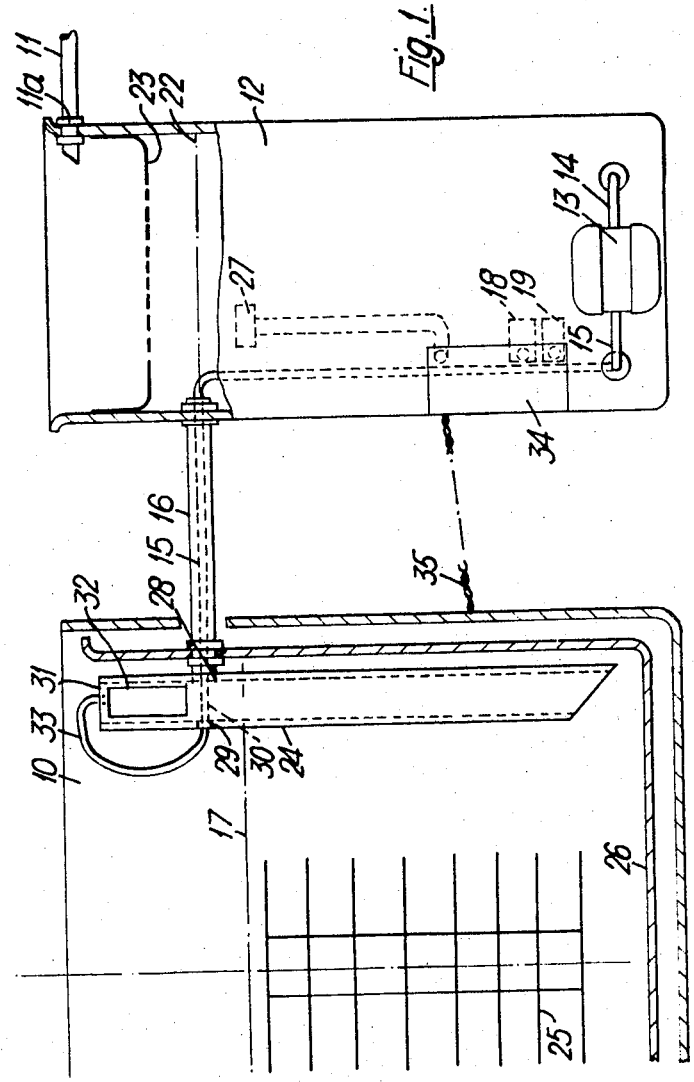
FIG. 1 is an elevation, in section, of one embodiment.

In FIG. 1 of the drawings, a rotating cathode electrolytic silver recovery unit 10, having a cathode assembly 25 rotating within a tank 26, is arranged to deal with the spent silver solution delivered at a variable rate from a film processing unit through a pipe 11. An auxiliary tank 12, which may be of synthetic plastics material, is placed upstream of the recovery unit 10 and receives the solution from the pipe 11 through a high level inlet connection 11a which delivers into a filter tray 23 in the top of the tank. Mounted low down internally of the tank 12 there is a metering pump 13 that draws solution from near the bottom of the tank through a suction pipe 14 and discharges it to the tank 26 of the recovery unit 10 through a delivery pipe 15. The delivery pipe 15 is of comparatively narrow bore and extends first back into and up through the tank 12 and then across from the tank 12 to the tank 26 of the recovery unit 10 where it delivers into the upper end of a down-pipe 24 in the tank 26 in a manner to be hereafter explained. There is also a high level overflow connection 16 between the tank 12 and the tank 26 of the recovery unit, the liquid level 17 in the recovery unit tank 26 being maintained below this connection by overflow from the recovery unit itself through an outlet (not shown) to drain. Conveniently, the delivery pipe 15 passes from the tank 12 to the tank 26 coaxially within the overflow pipe 16.

The starting and stopping of the pump 13 is under the control of level switches 18, 19. These may be simple float-operated electric switches. The switch circuits controlling the pump also switch on and off the recovery unit 10. The switch 18 is the "on" switch and is situated a short distance above the "off" switch 19, which in turn is situated near the bottom of the tank 12 but above the level of the inlet of the pump suction pipe 14.

When the inflow of silver solution from the film processor through the pipe 11 has filled the auxiliary tank 12 to the level of the "on" switch 18, both the metering pump 13 and the recovery unit 10 are automatically switched on. Both then run, maintaining constant operating conditions in the recovery unit 10, until such time as the level in the tank 12 may fall to the level of the "off" switch 19 when both are simultaneously switched off. The pump and recovery unit then do not run again until the level in the tank 12 has risen to the "on" switch.

The pump 13 is of a type that delivers its output in liquid slugs or pulses rather than as a continuous flow. The pump delivery rate, and the current amperage of the recovery unit, are preselected to suit each particular installation and no adjustments are needed, or indeed permitted, by the user. So far as the user is concerned, the equipment operates entirely automatically without attention. The user is not required even to switch the equipment on or off since this is controlled according to the processor output. There is no risk of the recovery unit being left switched on unnecessarily, or failing to be switched on when needed, due to human error.

Should the metering pump 13 fail, the solution in the tank 12 will rise to the overflow level 22. There will be no flooding but the unpumped liquid will simply overflow to drain via the recovery unit. A third switch 27 is sited in the tank 12 just below the level of the overflow pipe 16 and this serves as a high level alarm and lights a warning lamp to indicate excessive rise in level in the tank 12 due to pump failure.

Since the silver-containing solution being treated is electrically conductive, there would be the possibility of a silver deposit plating surfaces within the auxiliary tank unit 12, and also back within the film processing unit itself, if the solution were normally allowed to flow in a continuous stream from one unit to another. It is therefore necessary to cause the flow of solution to be interrupted by air breaks. To achieve an intermittent flow from the auxiliary tank 12 into the recovery unit 10 the pump is, as already mentioned, of a type that delivers its output in slugs or pulses. Also, a special design of down-pipe is employed in the recovery unit. The down-pipe 24 is basically a tube, with a diameter nearly twice that of the overflow pipe 16 extending from the auxiliary tank 12 to the recovery unit, and some distance down from its upper extremity the down-pipe 24 has a hole 28 cut in its side wall which receives the end of the overflow pipe 16. Diametrically opposite this hole there is a smaller hole 29, and the small-bore delivery pipe 15, emerging from the end of the overflow pipe 16, crosses within the down-pipe 24, as at 30, and passes out through the hole 29. The top end of the down-pipe 24 is closed by an end wall 31, and commencing just above the level of the hole 28 and extending up to the end wall 31 there is a comparatively large window opening 32 cut in the pipe wall. The small-bore delivery pipe 15, after passing out through the hole 29 in the side wall of the down-pipe 24, is looped up and round, as at 33, and its end is finally received in a hole in the end wall 31 of the pipe 24. By this means, each slug of silver solution being delivered into the down-pipe 24 by the pipe 15 drops first through the upper portion of the pipe 24 which is open to atmosphere through the window 32 and thus is maintained as a separate slug, without there being any tendency for hold-up in the down-pipe causing the slugs to join together. The windowed portion of the down-pipe 24 is, of course, always above the level 17 of the solution in the tank 26 of the recovery unit since, as already mentioned, the outflow from the recovery unit maintains that level below the level of the overflow pipe 16.

No special measures are needed to create an air break between the auxiliary tank 12 and the film processor unit since this already exists by reason of the filter tray 23 in the top of the tank.

Figure 2:
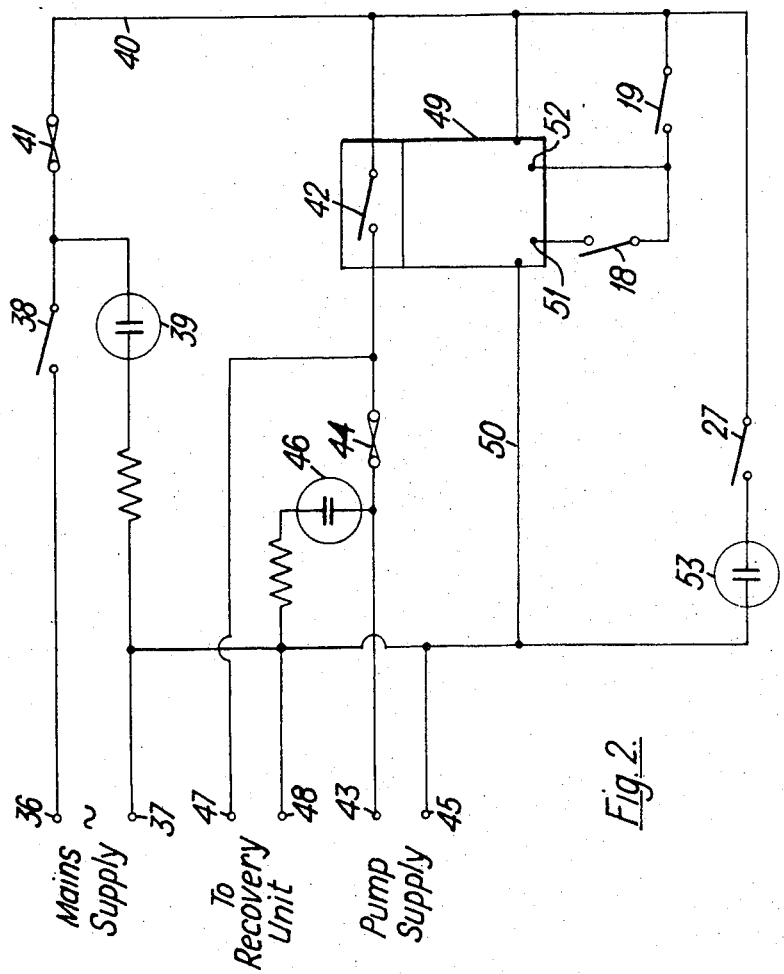
FIG. 2 is an electrical circuit diagram for the embodiment of FIG. 1.

Referring now also to FIG. 2, this shows a simplified electrical circuit diagram for the switches of the auxiliary tank unit 12. The switches 18, 19 and 27 are wired to circuitry contained within an external control box 34 (FIG. 1) mounted at the side of the tank, and this control box is in turn connected by cable leads 35 to the circuitry of the recovery unit 10.

The electrical mains supply is made available at terminals 36, 37, and closing of a main switch 38 causes an indicator lamp 39 to light and also connects a lead 40 to the line terminal 36 via a fuse link 41.

The supply to the pump 13 is controlled by main relay contacts 42. When the contacts 42 are closed the lead 40 is connected to one pump terminal 43 via a fuse link 44. The other pump terminal 45 is connected to the supply terminal 37. An indicator lamp 46 lights whenever the pump terminal 43 is live. Closing of the relay contacts 42 also makes the supply available at terminals 47, 48 connected to the recovery unit. The relay contacts 42 are operated by a relay control module 49 which is supplied with power through the leads 40, 50. The float-operated "on" and "off" switches 18, 19 in the tank 12 are connected, respectively, between terminals 51, 52 of the control module 49 and between terminal 52 and the lead 40. The float-operated high level alarm switch 27 is connected in series with a warning lamp 53. The whole of the relay and control module 42, 49 is advantageously a solid state encapsulated assembly.

It will be observed that the arrangement illustrated has been designed for conversion of the silver recovery unit to working according to the invention in a very simple way. Thus, the overflow connection 16 between the auxiliary tank 12 and the recovery unit 10 is, so far as the recovery unit is concerned, the same connection that hitherto has directly received the pipe 11 from the film processor. Also, the delivery pipe 15 from the pump 13 to the recovery unit is a comparatively narrow bore pipe which is threaded through the connection 16, thereby making a separate entry to the recovery unit tank unnecessary.

FIG. 3 shows, in flow chart diagram form, a modification in which a buffer or holding tank 54 is interposed between the film processing apparatus, or other source of waste silver solution to be treated; and the auxiliary tank 12. This large capacity holding tank 14 smooths out peaks in the waste solution outflow from the processing apparatus. It is also fitted with an electrical immersion heater 55 which is automatically switched on and off under the control of a temperature sensor 56 responsive to the temperature of the tank contents. In this way, the temperature of the waste solution in the holding tank 54, and hence also that flowing through the comparatively small capacity auxiliary tank 12 and the silver recovery machine 10, is brought within close limits for optimum plating efficiency.

The temperatures normally employed in photographic fixing baths are around 85° F, which is in the region of that needed in the silver recovery machine. Nevertheless, if solution is held for a considerable period in the tank 54, and especially during the night, the temperature may tend to fall significantly below that required if no heating element is fitted.

The invention has been described for the case where the silver recovery unit is coupled to an automatic film processing unit but it will be understood that it can also be of benefit in other situations, for instance in small processing houses where the spent silver solution is simply collected in receptacles and poured into the auxiliary tank 12. Nor is the invention restricted to employment only with rotating cathode type recovery units.

What I claim is:

1. A method for recovering silver from waste silver solutions, especially spent photographic processing liquids, said method utilizing: an electrically operated silver recovery machine of the type which includes an electrical supply for passing electric current between two electrodes and through waste silver solution in said machines; a feed line via which waste silver solutions having predetermined average silver concentrations are supplied for processing; an auxiliary tank arranged to receive waste silver solutions from said feed line; and a pump arranged to deliver waste silver solutions from said auxiliary tank to said silver recovery machine; said method comprising the steps of:

sensing the level of waste silver solutions in said auxiliary tank;
   operating said pump, in dependence on the level of waste silver solutions in said auxiliary tank, to deliver waste silver solutions at a constant flow rate from said auxiliary tank to said silver recovery machine, said pump being rendered inoperative when the level of waste silver solutions in said auxiliary tank recedes below a specified level; and
   in time coincidence with operation of said pump, operating said electrical supply at a constant current insufficient to produce silver sulfide in waste silver solutions having said predetermined average silver concentration, said electrical supply being rendered inoperative when said pump is rendered inoperative, whereby said recovery machine is operative throughout times when said pump is operating but not at other times.

2. The method according to claim 1 wherein said pump and said silver recovery machine are started and stopped together under the control of liquid-level responsive electrical switches associated with the auxiliary tank.

3. The method according to claim 1, further comprising a high liquid-level warning switch associated with the auxiliary tank.

4. The method according to claim 1 further comprising an overflow pipe connection to conduct overflow from said auxiliary tank into said recovery machine.

5. The method according to claim 4 wherein the delivery of waste solution by said pump to said recovery machine is via a further pipe which extends from the auxiliary tank to the recovery machine inside said overflow pipe.

6. The method according to claim 1 wherein said pump, when operating, delivers pulses of said waste solution.

7. The method according to claim 6 wherein flow delivery from the pump to the recovery machine is arranged in a manner to ensure that there are air breaks between successive liquid pulses of the delivered pump flow.

8. The method according to claim 7, wherein the delivered pump flow is directed into the upper end of a down-pipe of a relatively large diameter in the recovery machine, the upper portion of said down-pipe, which is above the liquid level in the recovery machine, having a side wall aperture that opens to atmosphere.

9. The method according to claim 1 wherein an electric heating element and a temperature sensing control therefore are employed to regulate the temperature of the waste solution being treated.

* * * * *